(12) United States Patent
de Heer et al.

(10) Patent No.: US 8,654,777 B2
(45) Date of Patent: Feb. 18, 2014

(54) METHODS AND APPARATUS FOR REALIZING A CONFIGURABLE MULTI-BRIDGE

(75) Inventors: Arie Johannes de Heer, Hengelo (NL); Ronald de Man, Den Haag (NL)

(73) Assignee: Alcatel Lucent, Paris (FR)

( * ) Notice: Subject to any disclaimer, the term of this patent is extended or adjusted under 35 U.S.C. 154(b) by 2110 days.

(21) Appl. No.: 11/095,121

(22) Filed: Mar. 31, 2005

(65) Prior Publication Data
US 2006/0221868 A1    Oct. 5, 2006

(51) Int. Cl.
*H04L 12/56*    (2011.01)

(52) U.S. Cl.
USPC ..................... 370/395.53; 370/401

(58) Field of Classification Search
USPC ............... 370/252, 254, 255, 256, 389, 392, 370/395.53, 401
See application file for complete search history.

(56) References Cited

U.S. PATENT DOCUMENTS

| | | | |
|---|---|---|---|
| 6,272,639 B1* | 8/2001 | Holden et al. ................ 726/12 |
| 2001/0005369 A1* | 6/2001 | Kloth .......................... 370/392 |
| 2002/0031090 A1* | 3/2002 | Kadambi et al. ......... 370/235.1 |
| 2003/0145118 A1* | 7/2003 | Volpano et al. ............. 709/249 |

* cited by examiner

*Primary Examiner* — Yong Zhou
(74) *Attorney, Agent, or Firm* — Wall & Tong, LLP

(57) ABSTRACT

A method and apparatus for adapting the switching process of a bridge to partition the bridge ports into a plurality of port subsets such that the bridge operates on each of the port subsets in an independent manner.

21 Claims, 9 Drawing Sheets

200

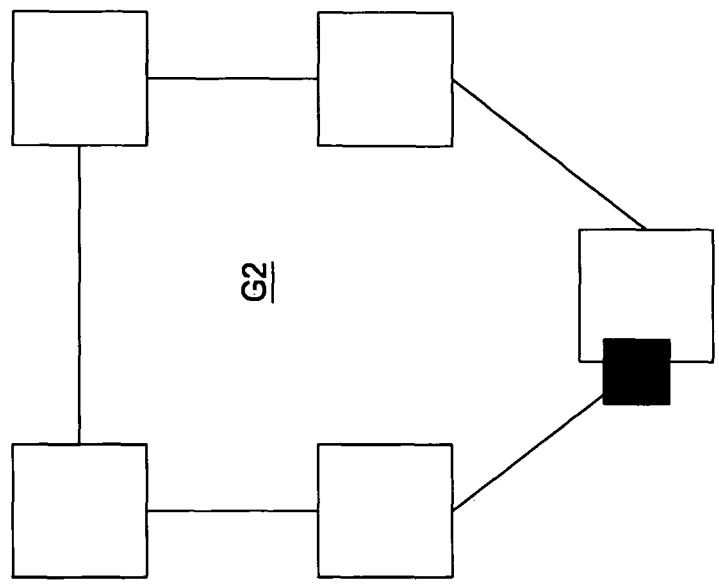
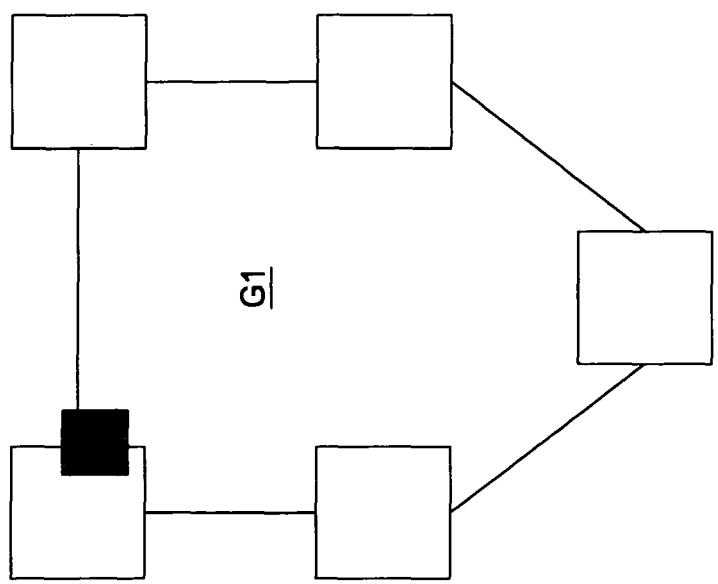
FIG. 6

METHODS AND APPARATUS FOR REALIZING A CONFIGURABLE MULTI-BRIDGE

FIELD OF INVENTION

The invention relates generally to the field of communication systems and, more specifically, to bridged network devices and methodology, such as bridged Ethernet networks.

BACKGROUND OF INVENTION

Bridged Ethernet networks consist of a number of Ethernet segments connected via Ethernet bridges. An Ethernet bridge has a number of Ethernet ports connected to Ethernet segments on which frames are received and transmitted, as well as a switch to couple frames received on an input port to one or more output ports. The function of an Ethernet bridge is to switch Ethernet frames between segments. Each Ethernet frame includes the source MAC address of the sending node and the destination MAC address of the receiving node. The behavior of an Ethernet bridge is described in more detail in the Institute of Electrical and Electronic Engineers (IEEE) Standard 802.1D, which is incorporated herein by reference in its entirety.

Depending upon the topology of a desired network, a network designer may be required to use two Ethernet bridges even though a single Ethernet bridge would suffice in terms of the number of Ethernet ports needed. For example, referring to FIG. 1, two disjoint networks are shown, each disjoint network consisting of three nodes. A first network comprises nodes A and C, which are connected via switch B. A second network comprises nodes D and F, which are connected via switch E. In this example, assuming that the switches B and E each have four or more Ethernet ports, it would seem that a single switch could be used to replace the two switches B and E.

Unfortunately, a conventional Ethernet bridge does not support this functionality in an appropriate manner. Specifically, assuming bridges B and E are replaced by a single bridge G, such as depicted in FIG. 2, traffic from node A will arrive at its destination of node C. However, such traffic may also arrive at nodes D or F. This routing of traffic to non-destination nodes may be unacceptable for reasons of network performance, network security and the like.

It is possible to separate a bridge into groups by using virtual local area networks (VLANs), where each VLAN is associated with a respective identifier (VLAN ID). Referring to FIG. 1, if one VLAN ID (denoted as X) is used for the traffic running between nodes A and C through bridges B and E, and another VLAN ID (denoted as Y) is used for the traffic running between nodes D and F through bridges B and E, then a substitution of bridges B and E by a single bridge G is possible. Bridge G blocks its ports to D and F for traffic associated with VLAN ID X, and block its ports to A and C for traffic associated with VLAN ID Y. It is also noted that VLANs may be employed to realize hierarchical spanning trees. This requires different VLANs to be used in the different groups (i.e., different domains), and to run a spanning tree per group of VLANs in each domain. To interconnect them one needs VLAN translation over a link, if the domains are connected by links, or VLAN translation within a node.

Unfortunately, these alternative solutions based on the use of VLANs require careful provisioning of the network, and put restrictions on the VLAN IDs used on different networks. This complexity limits the utility of the VLAN solution as the size and/or complexity of the network increases, such as with newer telecommunications networks.

SUMMARY OF THE INVENTION

Various deficiencies of the prior art are addressed by the present invention of a method and apparatus for adapting the switching process of a bridge to partition the bridge ports into a plurality of port subsets such that the bridge operates on each of the port subsets in an independent manner.

Specifically, a method for adapting a network switching process according to one embodiment of the invention comprises: logically partitioning the ports of a bridge into a plurality of port subsets; and adapting the operation of said bridge to ensure that data is only coupled between ports associated with the same port subset.

BRIEF DESCRIPTION OF THE DRAWINGS

The teachings of the present invention can be readily understood by considering the following detailed description in conjunction with the accompanying drawings, in which:

FIGS. 6-9 depict network topology diagrams useful in understanding the present invention.

To facilitate understanding, identical reference numerals have been used, where possible, to designate identical elements that are common to the figures.

DETAILED DESCRIPTION OF THE INVENTION

The present invention will be primarily described within the context of adapting the switching process of an Ethernet bridge to partition Ethernet bridge ports of one bridge into a plurality of port subsets such that the Ethernet bridge operates on each of the port subsets in an independent manner. However, it will be appreciated that other network topologies and techniques functioning in a relevant manner similar to that described herein with respect to Ethernet will also benefit from the present invention. Moreover, the present invention will be primarily described within the context of a configurable bridge, such as an Ethernet bridge, having four ports. However, it will be appreciated that many more ports may be employed within a bridge or other switching device adapted according to the present invention.

The invention will be described first within the context of realizing virtual bridges, and then within the context of using virtual bridges for hierarchical spanning trees and for dedicated Ethernet networks per customer.

Realizing a Virtual Bridge

Figure 1A:
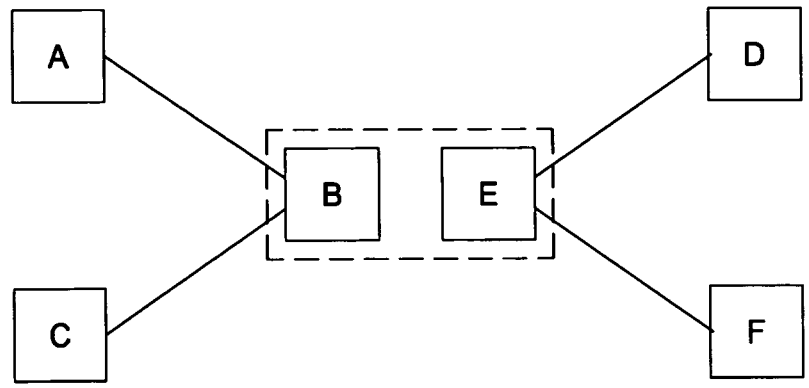
FIGS. 1A and 1B depict network topology diagrams useful in understanding the present invention.
Figure 1B:
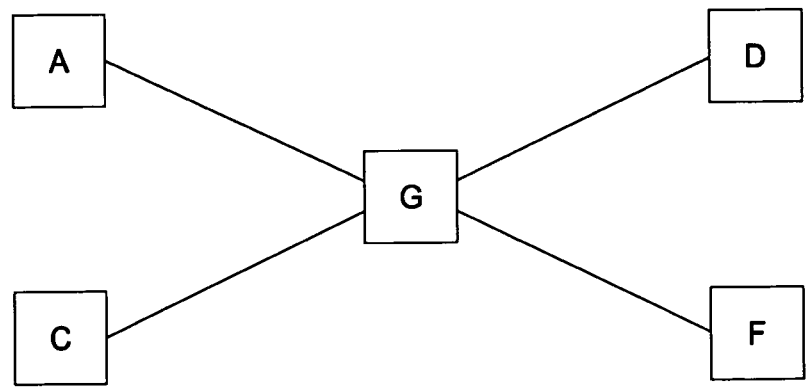
Figure 2:
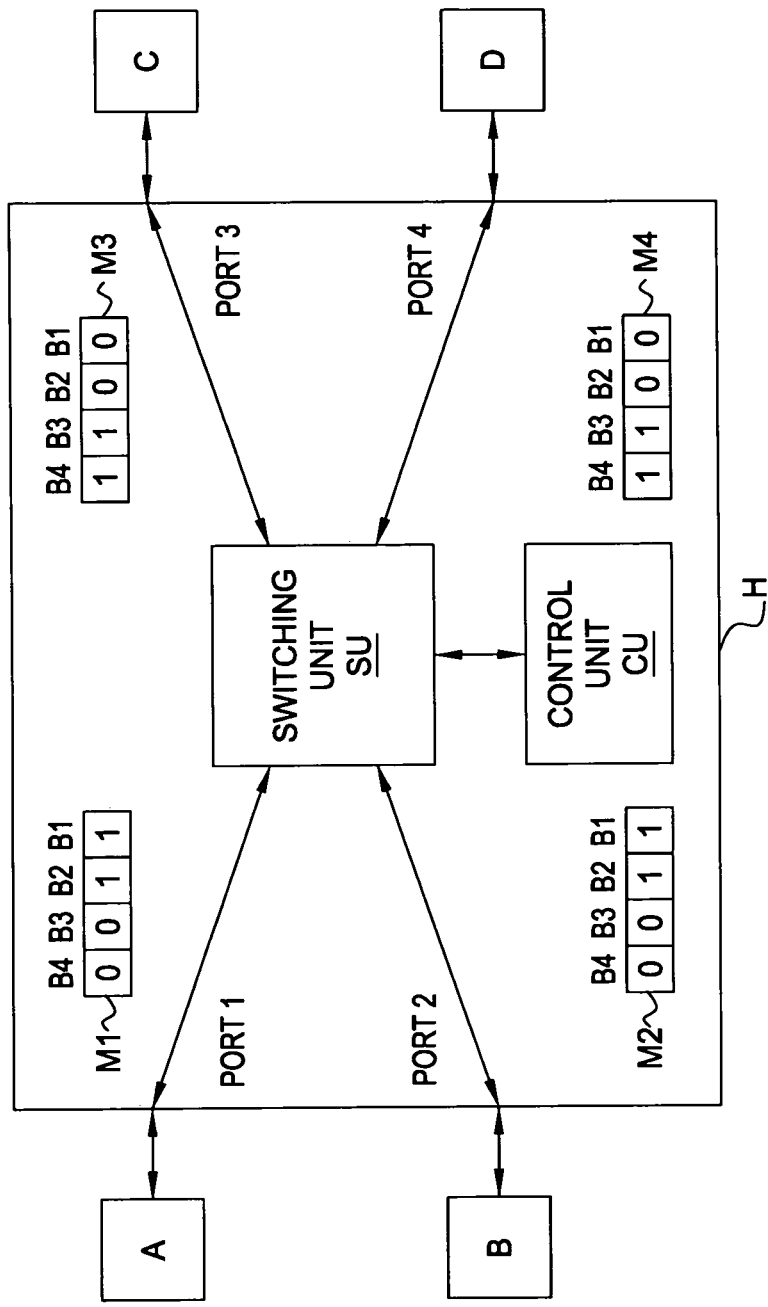
FIG. 2 depicts a high level block diagram of a network topology including a configurable bridge according to an embodiment of the present invention.

FIG. 2 depicts a high level block diagram of a network topology including a configurable bridge according to an embodiment of the present invention. Specifically, the network topology 200 of FIG. 2 comprises a plurality of nodes, illustratively four nodes, denoted as A, B, C and D, as well as a configurable bridge H. Nodes A, B, C and D are coupled to, respectively, ports 1, 2, 3 and 4 of the configurable bridge H.

For purposes of this discussion it will be assumed that the configurable bridge H is partitioned to implement two independent network paths; namely, a first independent network supporting communication between only nodes A and B, and a second independent network supporting communication only between nodes C and D. That is, the configurable bridge partitions its ports into port subsets, where each port subset supports a respective independent network.

The configurable bridge H comprises a switching unit SU and a control unit CU. The switching unit SU is capable of communicating data between any of the illustratively four ports within the configurable bridge H. The control unit CU, which will be described in more detail below with respect to FIG. 3, controls the operation of switching unit SU. Generally speaking, the control unit causes the switching unit SU to transfer data only between ports of the same independent network or port subset.

In one embodiment of the invention, the identification of appropriate port subset membership is made using a bit sequence associated with each port. The bit sequences for the ports may be stored in the control unit CU or in a memory associated with the switching unit SU. Specifically, as depicted in FIG. 2, ports 1, 2, 3 and 4 are associated with respective bit sequences M1, M2, M3 and M4 (collectively bit sequences M). Each of the bit sequences M comprises four bits denoted as b1, b2, b3 and b4. The state of bits b1-b4 of a bit sequence identifies, for the corresponding port, those other ports within the independent network (i.e., within the port subset) including the corresponding port. Those bits set to a first logical state (e.g., 1 or high) represent other ports to which the corresponding port is allowed to communicate with. Those bits set to a second logical state (e.g., 0 or low) represent other ports to which the corresponding port is not allowed to communicate with.

Referring to FIG. 2, memory M1 and M2 each have bits b1 and b2 set, while memories M3 and M4 each have bits b3 and b4 set. Thus ports 1 and 2 may only communicate with each other to form thereby a first port subset, while ports 3 and 4 ports may only communicate with each other to form thereby a second port subset. Thus, the configurable bridge H implements 2 independent networks that are supported by two respective subsets of ports. It is noted that a configurable bridge may have many more than four ports, many more than two port subsets, and many more than two independent networks.

In one Ethernet bridge embodiment of the invention, several conditions are established; namely, (1) the bridge must provide for a way to record the partitioning of its Ethernet ports into subsets, (2) when matching the destination MAC address of a frame F with entries in the address table, a match is only made if the port stored in the entry is in the same subset as the port on which frame F was received, and (3) if set S is a subset in such a partitioning, and if an Ethernet port P is a member of S, then frames received on port P must only be forwarded on ports that are included in the port set S.

In one embodiment, for each port P of the bridge a sequence of bits is associated and stored in the bridge. Each bit corresponds to an Ethernet port of the bridge. A bit is set to the value 1 if and only if its corresponding port is in the same subset as P.

In one embodiment, each port in the same subset has an identical sequence of bits. In this embodiment, the address table may be implemented in the form of a hash table, and the lookup function only registers a match for the destination address of frame F if the bit sequence associated with the port on which F was received is identical to the bit sequence associated to the port stored in the table entry. The hashing function optionally takes into account the value of this bit sequence, so that the same address learned on different subsets is stored in different entries.

In one embodiment, if the destination address of a frame is not found in the address table during the switching process, the frame is forwarded only to ports in the same subset as the port on which the frame was received. These ports can again be determined using the bit sequence associated to the port on which the frame was received.

Figure 3:
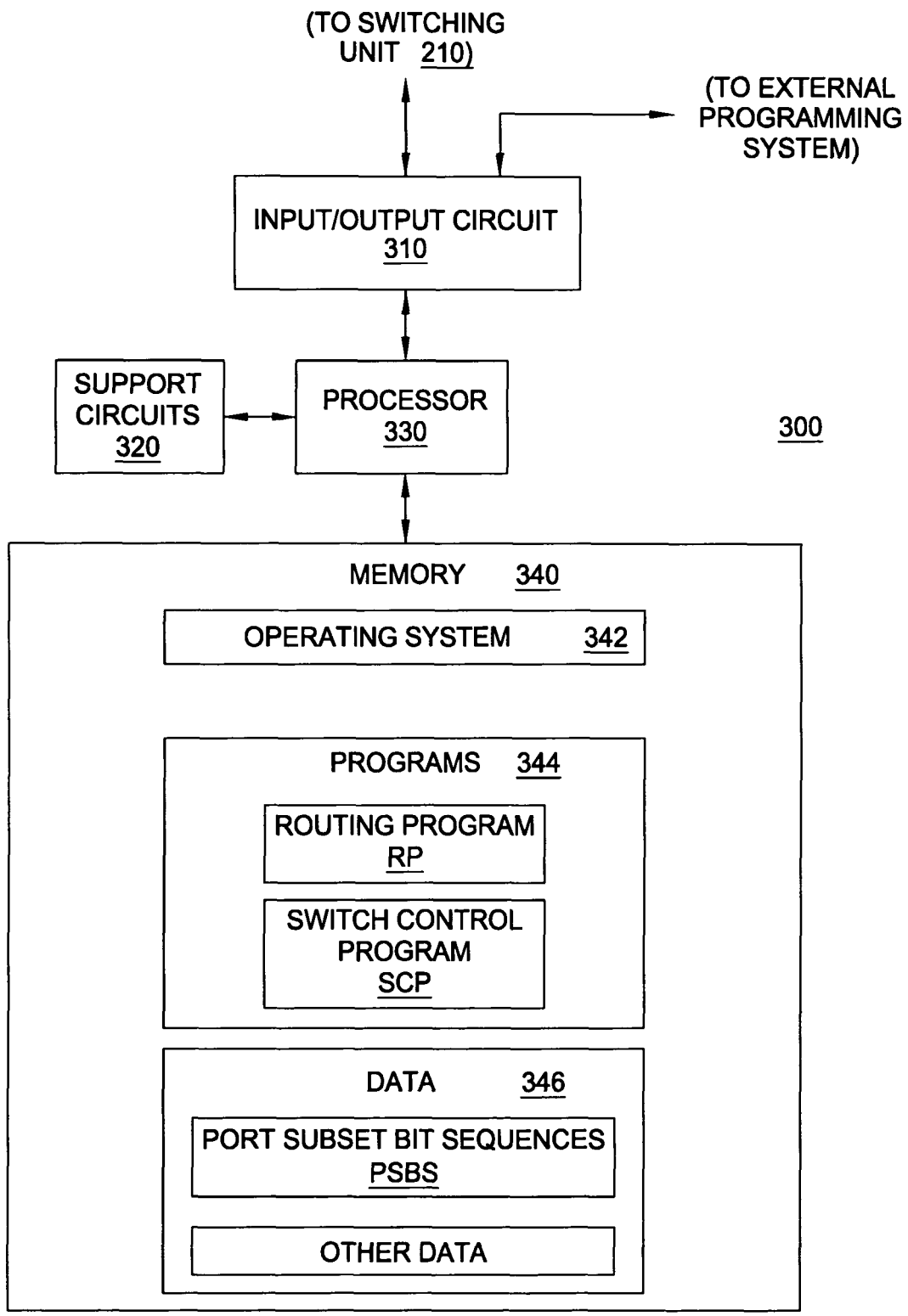
FIG. 3 depicts a high level block diagram of a controller suitable for use in the configurable bridge of FIG. 2.

FIG. 3 depicts a high level block diagram of a controller suitable for use in the configurable bridge of FIG. 2. Specifically, the controller 300 of FIG. 3 may be employed to implement functions supporting either of the switching unit SU or control unit CU within configurable bridge H of FIG. 2.

The controller 300 of FIG. 3 comprises a processor 330 as well as memory 340 for storing various control programs and other programs 344 as well as data 346. The memory 340 may also store an operating system 342 supporting the programs 344.

The processor 340 cooperates with conventional support circuitry 320 such as power supplies, clock circuits, cache memory and the like as well as circuits that assist in executing the software routines stored in the memory 340. As such, it is contemplated that some of the steps herein as software processes may be implemented with hardware, for example, as circuitry that cooperates with the processor 330 to perform various steps. The controller 300 also contains input/output (I/O) circuitry 310 that forms an interface between the various functional elements communicating with the controller 200, such as the switching unit SU and, optionally, an external programming system (not shown).

Although the controller 300 is depicted as a general purpose computer that is programmed to perform various control functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware or combination thereof.

The invention may be implemented as a computer program product wherein computer instructions, when processed by a computer or processor, adapt the operation of the computer or processor such that the methods and/or techniques of the present invention are invoked or otherwise provided. Instructions for invoking the inventive methods may be stored in fixed or removable media, transmitted via a data stream in a broadcast media or other signal bearing medium, and/or stored within a working memory within a computing device operating according to the instructions.

The memory 340 is depicted as comprising programs 344 including a routing program RP and a switch control program ACP. These programs are used, in various embodiments, to implement the operations of the configurable bridge H. Moreover, in memory 340 includes data 346, such as may be used to store the port subset bit sequences PSBS discussed above with respect to FIG. 2 as port memories M1, M2, M3 and M4.

Figure 4:
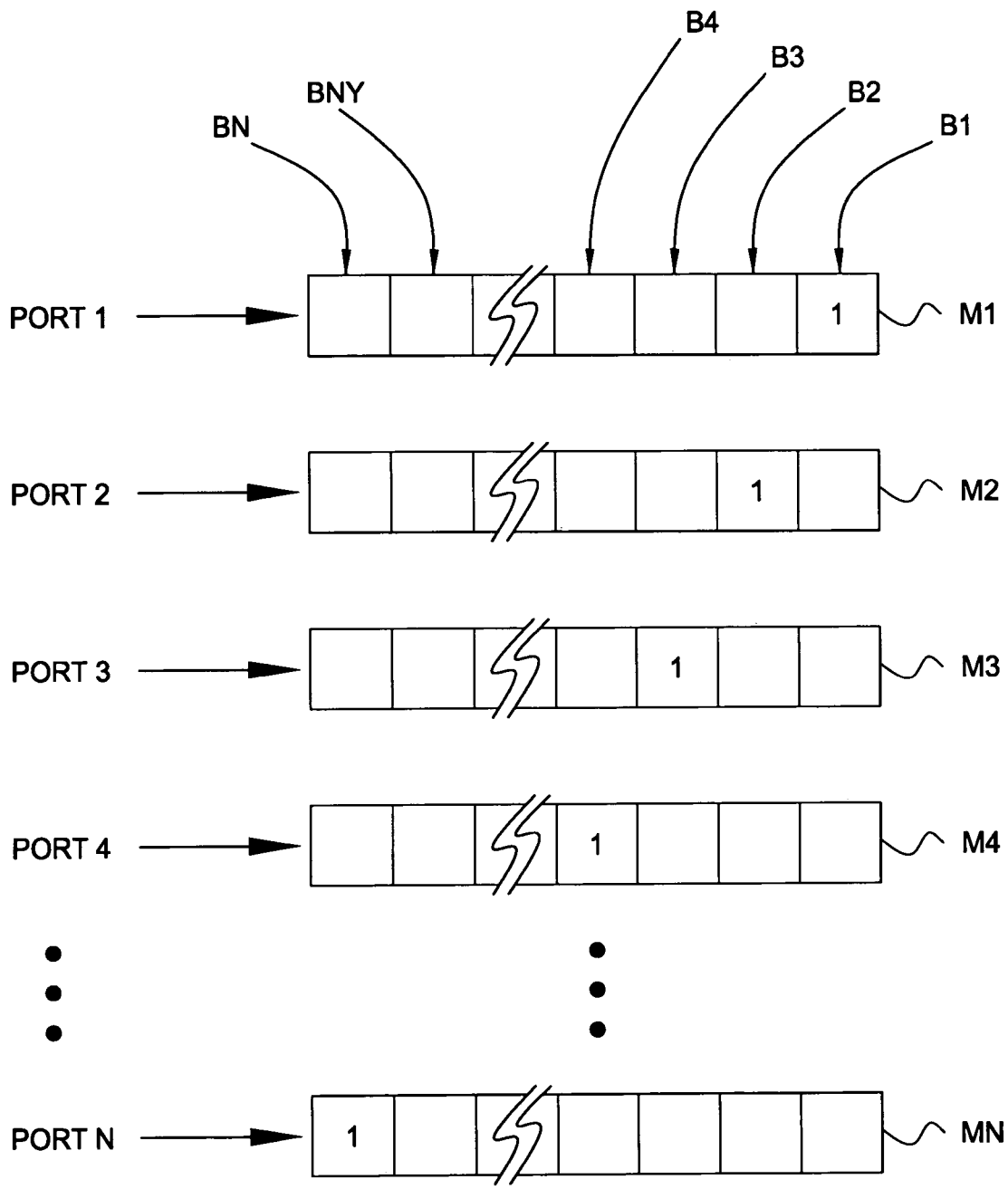
FIG. 4 depicts the data structure useful in understanding an embodiment of the present invention.

FIG. 4 depicts the data structure useful in understanding an embodiment of the present invention. Specifically, the data structure 400 of FIG. 4 comprises a plurality of port memories M1-MN, where each port memory M is associated with respective 1 of the N ports within a configurable bridge. Each of the port memories M comprises a bit sequence of, illustratively, N bits, where each bit represents one of the N ports. The bit sequences may be used to identify port subset membership as discussed above with respect to FIG. 2. The port memories M may comprise fewer than N bits, where each bit represents more than one other port, or where each port is only able to or adapted to communicate with at most a subset or portion of the remaining other ports.

Figure 5:
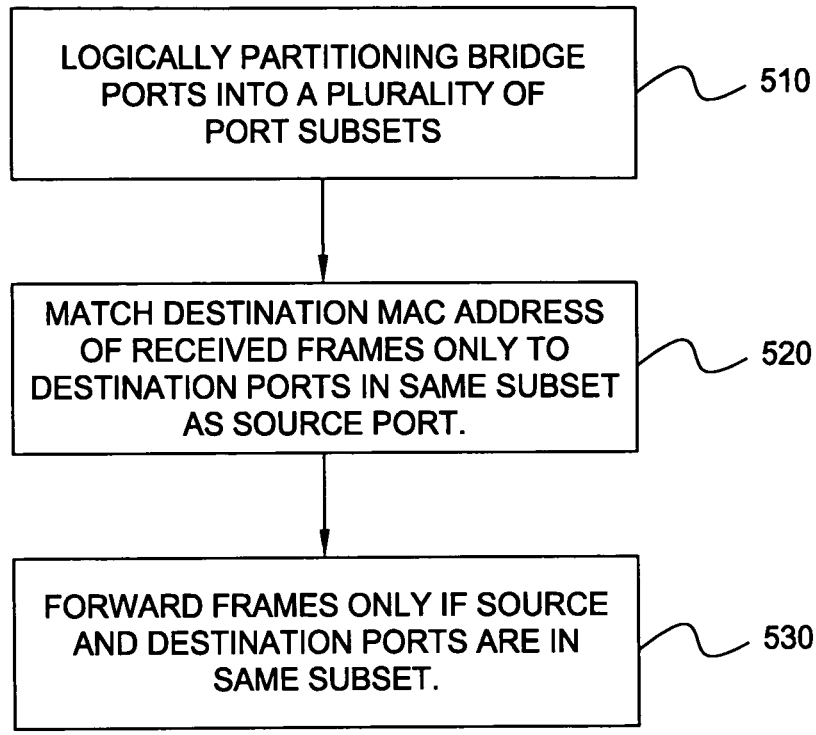
FIG. 5 depicts a flow diagram of a method according to an embodiment of the present invention.

FIG. 5 depicts a flow diagram of a method according to an embodiment of the present invention. Specifically, the method 500 of FIG. 5 is suitable for use in the configurable bridge H described above with respect to the various FIGs.

At step 510, the bridge is logically partitioned into a plurality of port subsets. This logical partitioning may be accomplished by assigning and storing a unique identifier for each port subset, by indicating to each port which other ports may be communicated with or by other means. Various means disclosed herein may be used to effect this function, such as the use of bit sequences and other identifiers.

At step 520, the destination MAC address of a received frame(s) is matched to only those destination ports in the same port subset as the source port. At step 530, the frame(s) are forwarded to the destination ports only of the source and destination ports are in the same port subset. After an initial or default logical partitioning at step 510, steps 520-530 are iteratively performed as data frames are received. Step 510 is optionally repeated in response to a control input or user input indicative of a reconfiguration of the bridge.

Using the Virtual Bridge for Hierarchical Spanning Trees.

Figure 9:
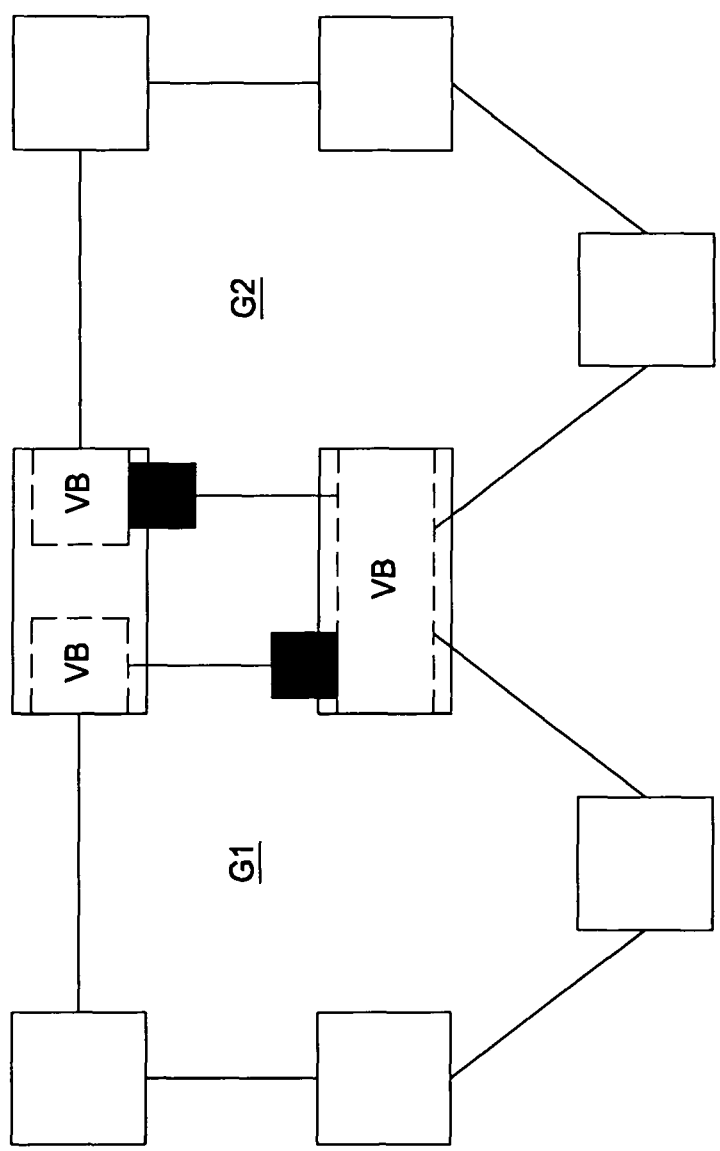

In a Bridged Ethernet Network, the Spanning Tree Protocol (STP) is adapted to ensure that the topology is loop free. The STP blocks certain ports in the network such that there is loop free connectivity between all nodes. For the purpose of running STP virtual bridges in a network, a node can be considered to be interconnected via a full mesh of virtual connections. FIG. 9 shows such a configuration where the operation of STP has decided that for each link there is at least one port blocked. If by the operation of STP both ports connected to a link are unblocked this results in merging the virtual nodes into one virtual node, as shown in FIG. 9. The STP remains to operate as there are two different nodes each with its own STP control entity. If the link between the two nodes needs to be blocked again, the merged node is split into two nodes. The STP is adapted to block selected ports in the network such that loop free connectivity between nodes is provided.

It is deemed to be desirable to have domains running their own version of spanning tree protocol (STP), independently of each other. All these independent domains are preferably interconnected in a loop free manner as well (by, for example, another instance of STP or by provisioning). By providing the ability to block traffic flow within a node, the present invention enables such loop free interconnectivity. Specifically, the invention enables the splitting of a node into virtual bridges to create thereby one or more blocked links inside the node. Joining the virtual bridges unblocks that link. Thus, a loop free topology is created by splitting/joining virtual nodes, and treating this as a blocking and unblocking of links.

Within the context of hierarchical spanning trees, associated bridges are grouped, where each group operates its own spanning tree(s). To interconnect the different groups, another spanning tree is established between the groups to be interconnected. The spanning trees within a group are independent from the spanning trees between groups. Where each bridge is part of only one group, such independence is easy to realize.

In this scenario the spanning tree which interconnects the different groups cannot block links between these groups, because there are no such links. One way to build an interconnection spanning tree is to let the interconnection spanning tree block links in the spanning tree of a group. But then the spanning trees within groups and between groups are no longer independent. Advantageously, the present invention provides an improved solution by allowing a blocked link within a bridge.

Specifically, referring to FIG. 6, two separate ring network groups G1 and G2 are running their own spanning trees. Each group has one node including a blocked port (designated as shaded portion). Assume that it is desirable to interconnect the ring groups.

Figure 7:
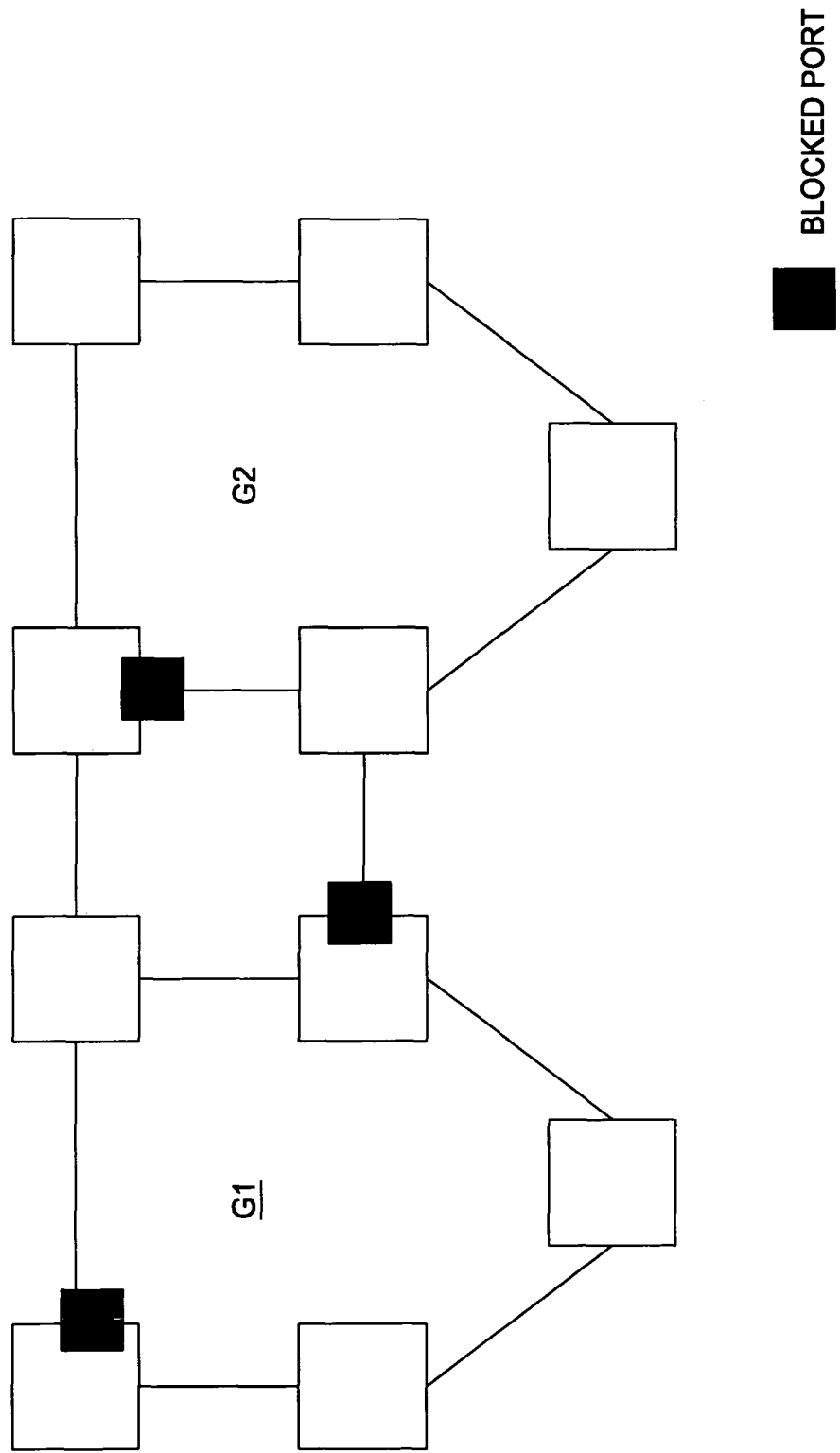

Referring to FIG. 7, the ring groups are interconnected via links, wherein the topology remains loop free as long as one interconnecting link is blocked, such that the spanning tree rings can continue to run independently.

Figure 8:
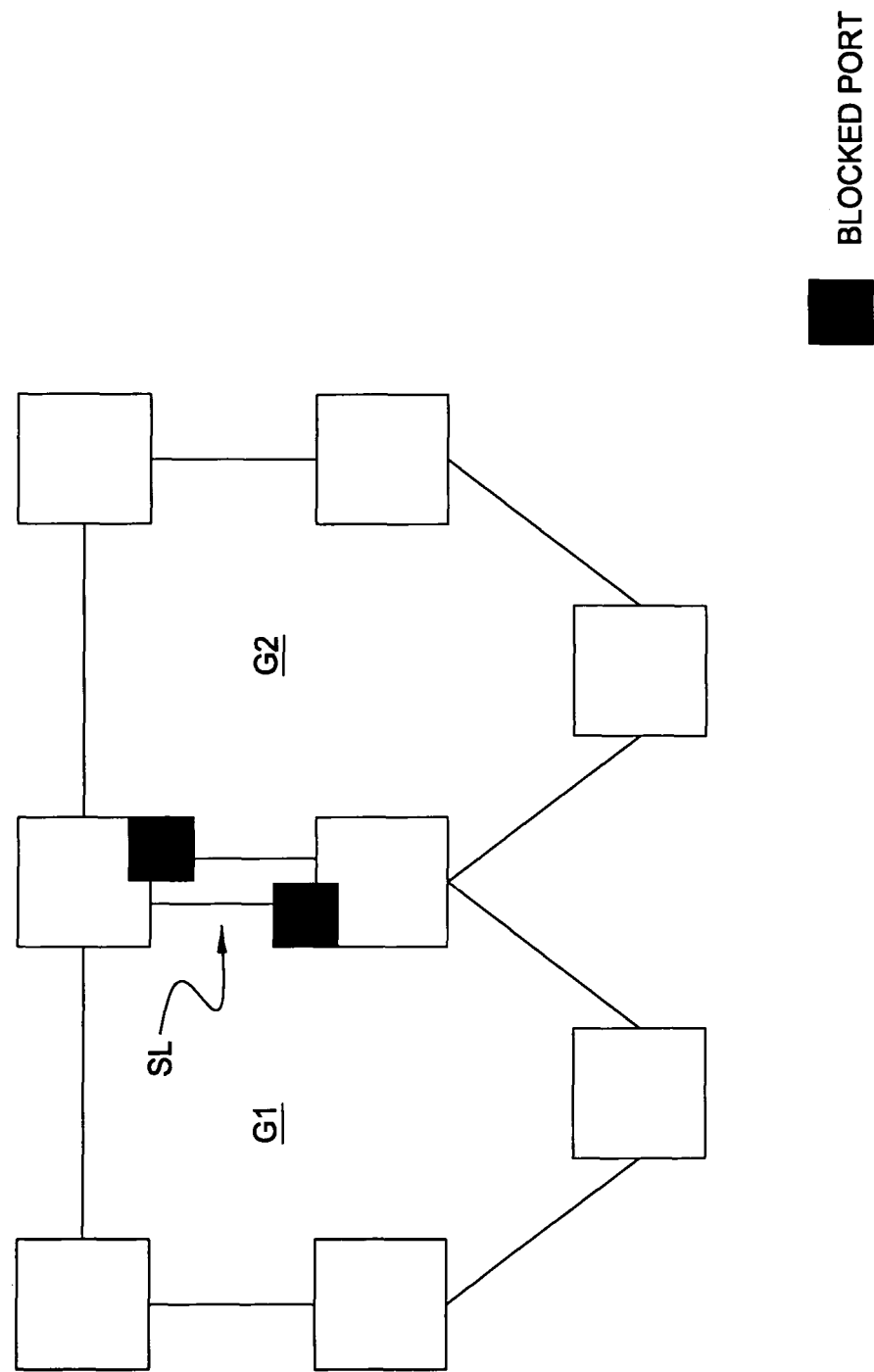

Referring to FIG. 8, the ring groups are interconnected via shared nodes. Unfortunately, the STP in the rings in the rings is no longer independent since a link SL is shared. Unfortunately, even if both ring groups block this shared link, a loop would still exist.

Referring to FIG. 9, in one embodiment of the present invention the problem of the topology of FIG. 8 is avoided by splitting the nodes supporting the shared link into virtual nodes. Each ring group runs its own STP, and the ring groups are interconnected via links. Blocking one of these links is functionally equivalent to having two virtual nodes, unblocking is merging the two virtual nodes into one node.

In one embodiment of the invention, the splitting/combining of virtual bridges is used in a manner equivalent to the blocking/unblocking of links. While depicted as being tied to hierarchical spanning trees, this restriction is not necessary since such an equivalent use can also be applied to a single Spanning tree. For example, in the topology of FIG. 9, if there is one STP for the whole network, then one of the two shared nodes still has one Virtual bridge to the other two. This is a special case of hierarchical STP; namely, a hierarchy with only one level.

Thus, the teachings of the present invention may be extended to a bridge with support for VLANs. If the bridge supports spanning tree per VLAN, the bridge may optionally support a partitioning into subsets per VLAN. If the bridge does not support a partitioning into subsets per VLAN, then the realization of the present invention remains almost unchanged and only the VLAN ID is taken into account when matching a MAC address.

In one embodiment of the invention a configurable bridge supporting a partitioning into subsets per VLAN protocols is provided. Specifically, several conditions are established; namely (1) the bridge provides for a way to record, per VLAN, the partitioning of its Ethernet ports into subsets, (2) when matching the destination MAC address of a frame F with entries in the address table, a match is only made if the port stored in the entry is in the same subset as the port on which frame F was received, according to the partitioning determined by the VLAN ID of frame F, and (3) if the port set S is a subset in a partitioning associated to a VLAN ID, and if the Ethernet port P is a member of the port set S, then frames with VLAN ID V received on port P is only forwarded on ports that are included in the port set S.

Using the Virtual Bridge for Dedicated Ethernet Networks.

In one embodiment of the invention, virtual bridges are used to provide dedicated Ethernet networks for individual customers. Specifically, from a service perspective, a service provider (SP) selling Ethernet connectivity to its customers may connect their local area network (LAN) segments to the various bridges of the SP. The LAN segments are then connected via the network of the SP. In this case, the bandwidth of the SP's network may be shared between different customers. If a customer wants to buy dedicated bandwidth (i.e., bandwidth not shared with other customers), the SP decouples the connections associated with this customer from the connections associated with this customer from the connections associated with other customers.

Although various embodiments that incorporate the teachings of the present invention have been shown and described in detail herein, those skilled in the art can readily devise many other varied embodiments that still incorporate these teachings.

What is claimed is:

1. A method for a bridge comprising a plurality of ports, comprising:

receiving a data frame at the bridge, the bridge configured to support a logical partitioning of the ports of the bridge into a plurality of port subsets, each of the ports having associated therewith a respective port identifier that identifies other ports belonging to the port subset of the port, the data frame being received via one of the ports of the bridge, the one of the ports of the bridge being a source port of the data frame, the data frame including a destination address;

comparing the destination address of the data frame with addresses of address entries of an address table, wherein a match is made for the data frame on an address entry of the address table only if an address stored in the address entry matches the destination address of the data frame and a port stored in the address entry is in the same port subset as the source port of the data frame; and communicating the data frame from the source port to a destination port on which the data frame is to be transmitted based on a determination that the source port and the destination port are part of the same port subset.

2. The method of claim 1, wherein the step of communicating the data frame comprises:

initiating communication of the data frame from the source port to the destination port based on a determination that a match is made on an address entry of the address table for the data frame.

3. The method of claim 1, wherein the step of communicating the data frame comprises:

initiating communication of the data frame from the source port to each of the other ports included in the same port subset as the source port based on a determination that no match is made in the address table for the data frame.

4. The method of claim 1, wherein the logical partitioning of the ports of the bridge into the plurality of port subsets is associated with one of a plurality of Virtual Local Area Networks (VLANs) supported by the bridge.

5. The method of claim 1, wherein the logical partitioning of the ports of the bridge into the plurality of port subsets is a first logical partitioning of the ports of the bridge into a first plurality of port subsets, wherein the bridge is configured to support a second logical partitioning of the ports of the bridge into a second plurality of port subsets, the port subsets in the first plurality of port subsets being different than the port subsets in the second plurality of port subsets.

6. The method of claim 5, wherein the first logical partitioning is associated with a first Virtual Local Area Network (VLAN) and the second logical partitioning is associated with a second VLAN.

7. The method of claim 1, wherein the logical partitioning of the ports of the bridge into the plurality of port subsets is associated with one of a plurality of virtual bridges supported by the bridge.

8. The method of claim 7, wherein the virtual bridges are configured to run a respective plurality of versions of a spanning tree protocol (STP).

9. The method of claim 1, wherein the plurality of port subsets comprises a first port subset providing a first virtual bridge and a second port subset providing a second virtual bridge, the method comprising:

connecting the first virtual bridge and the second virtual bridge, based on a spanning tree protocol, by combining the first port subset and the second port subset.

10. The method of claim 1, further comprising:

splitting, based on a spanning tree protocol, one of the port subsets into a first port subset configured to provide a first virtual bridge and a second port subset configured to provide a second virtual bridge.

11. A bridge, comprising:

a plurality of ports; and a processor and a memory communicatively connected to the processor, the processor configured to:

receive a data frame at the bridge, the bridge configured to support a logical partitioning of the ports of the bridge into a plurality of port subsets, each of the ports having associated therewith a respective port identifier that identifies other ports belonging to the port subset of the port, the data frame being received via one of the ports of the bridge, the one of the ports of the bridge being a source port of the data frame, the data frame including a destination address;

compare the destination address of the data frame with addresses of address entries of an address table, wherein a match is made for the data frame on an address entry of the address table only if an address stored in the address entry matches the destination address of the data frame and a port stored in the address entry is in the same port subset as the source port of the data frame; and communicate the data frame from the source port to a destination port on which the data frame is to be transmitted based on a determination that the source port and the destination port are part of the same port subset.

12. The bridge of claim 11, wherein, to communicate the data frame, the processor is configured to:

initiate communication of the data frame from the source port to the destination port based on a determination that a match is made on an address entry of the address table for the data frame.

13. The bridge of claim 11, wherein, to communicate the data frame, the processor is configured to:

initiate communication of the data frame from the source port to each of the other ports included in the same port subset as the source port based on a determination that no match is made in the address table for the data frame.

14. The bridge of claim 11, wherein the logical partitioning of the ports of the bridge into the plurality of port subsets is associated with one of a plurality of Virtual Local Area Networks (VLANs) supported by the bridge.

15. The bridge of claim 11, wherein the logical partitioning of the ports of the bridge into the plurality of port subsets is a first logical partitioning of the ports of the bridge into a first plurality of port subsets, wherein the bridge is configured to support a second logical partitioning of the ports of the bridge into a second plurality of port subsets, the port subsets in the first plurality of port subsets being different than the port subsets in the second plurality of port subsets.

16. The bridge of claim 15, wherein the first logical partitioning is associated with a first Virtual Local Area Network (VLAN) and the second logical partitioning is associated with a second VLAN.

17. The bridge of claim 11, wherein the logical partitioning of the ports of the bridge into the plurality of port subsets is associated with one of a plurality of virtual bridges supported by the bridge.

18. The bridge of claim 17, wherein the virtual bridges are configured to run a respective plurality of versions of a spanning tree protocol (STP).

19. The bridge of claim 11, wherein the plurality of port subsets comprises a first port subset providing a first virtual bridge and a second port subset providing a second virtual bridge, the processor configured to:
   connect the first virtual bridge and the second virtual bridge, based on a spanning tree protocol, by combining the first port subset and the second port subset.

20. The bridge of claim 11, the processor configured to:
   split, based on a spanning tree protocol, one of the port subsets into a first port subset configured to provide a first virtual bridge and a second port subset configured to provide a second virtual bridge.

21. A non-transitory computer-readable storage medium storing instructions which, when executed by a computer, cause the computer to perform a method for a bridge comprising a plurality of ports, the method comprising:
   receiving a data frame at the bridge, the bridge configured to support a logical partitioning of the ports of the bridge into a plurality of port subsets, each of the ports having associated therewith a respective port identifier that identifies other ports belonging to the port subset of the port, the data frame being received via one of the ports of the bridge, the one of the ports of the bridge being a source port of the data frame, the data frame including a destination address;
   comparing the destination address of the data frame with addresses of address entries of an address table, wherein a match is made for the data frame on an address entry of the address table only if an address stored in the address entry matches the destination address of the data frame and a port stored in the address entry is in the same port subset as the source port of the data frame; and
   communicating the data frame from the source port to a destination port on which the data frame is to be transmitted based on a determination that the source port and the destination port are part of the same port subset.

* * * * *